Dec. 9, 1969     J. C. ENGEL ET AL     3,483,429

LOW COST, SOLID STATE PHOTOCONTROL CIRCUIT

Filed May 16, 1967

WITNESSES

INVENTORS
Joseph C. Engel
and Robert T. Elms

BY

ATTORNEY

United States Patent Office 3,483,429
Patented Dec. 9, 1969

3,483,429
LOW COST, SOLID STATE PHOTOCONTROL CIRCUIT
Joseph C. Engel, Penn Hills, Pittsburgh, and Robert T. Elms, Wilkinsburg, Pittsburgh, Pa., assignors to Westinghouse Electric Corporation, Pittsburgh, Pa., a corporation of Pennsylvania
Filed May 16, 1967, Ser. No. 638,811
Int. Cl. H05b 37/02, 39/04, 41/36
U.S. Cl. 315—156                     8 Claims

ABSTRACT OF THE DISCLOSURE

A condition sensing control circuit for controlling the supply of alternating voltage to a load using a solid state symmetrical switch adapted to be connected in series with the load across the supply of alternating voltage. The symmetrical switch is gated by a gate circuit which includes a trigger diode, a voltage divider network including a condition sensing means, and a capacitor circuit. The sensing means is connected to develop a diode trigger voltage for gating the symmetrical switch when the condition reaches a certain level during half cycle swings of one polarity of the alternating voltage. The capacitor circuit is connected to produce a series of gate pulses during the beginning and ending periods of the half cycle swings of the one polarity, and during whole periods of the half cycle swings of the other polarity of the alternating voltage.

BACKGROUND OF THE INVENTION

Figure 1:
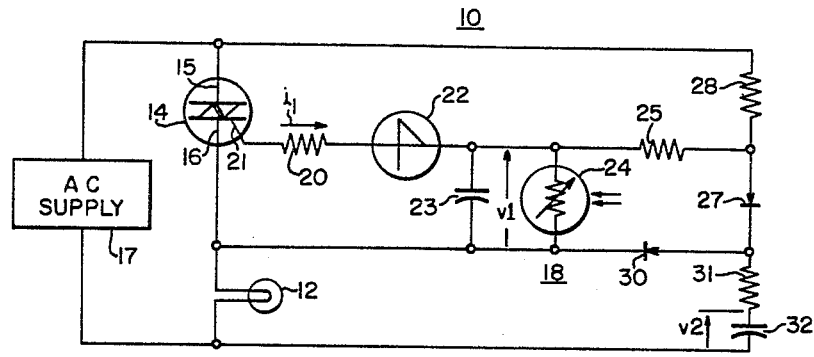

The present invention relates generally to low cost, solid state control circuits designed to control the application of power to a load or loads in response to a changing condition such as the changes in level of natural light. The invention has particular utility in controlling the application of power to lamps and light fixtures in response to predetermined levels of natural outdoor light, though the invention is not limited thereto.

Photocontrol circuits using mechanical relays for controlling the application of power to load devices are troubled by the short life of both the photocell and the relay contacts. The limited relay life is the result of contact arcing caused by load inductance; the poor photocell life is caused by the required high power dissipation of the cell.

With the advent of solid state or semiconductor symmetrical switching devices, the mechanical relays have been replaced by such devices so that the problem of poor relay contact life has been eliminated. Solid state symmetrical switches have, however, had certain difficulties and disadvantages involving the gating circuit for the switches. The gating circuits have been costly, they have provided the control circuit with deficient latch in and off characteristics, and a poor hysteresis characteristic.

When an alternating voltage is applied to a load through a solid state symmetrical switch, the switch is turned off each time the polarity of the voltage reverses. Thus, for each direction of current flow, the switch must be gated, which heretofore has resulted in phase control of the voltage application process; that is, the switch is not turned on (gated) until a time well into the next half cycle swing which results in a reduced width half cycle alternating voltage applied to the load. Such a voltage configuration produces radio frequency noise.

In view of this phase control difficulty with a solid state symmetrical switch, the present invention provides a novel gate circuit that latches the switch in an "on" condition for substantially the full half cycle of each voltage swing of the alternating power voltage, and latches the switch in an off, nonconducting state in response to a prevailing condition such as available ambient light.

The hysteresis problem with solid state symmetrical switches involves the ratio of the light levels required for turning the switch off and on. Heretofore, slight changes in the level of light seen by the photocell, for example changes resulting from a cloud or airplane passing by, have caused the energization and deenergization of the lamp loads with the attendant nuisance and power loss.

In the present invention, the off and on light level ratio is made sufficiently large by operation of a voltage divider network in the novel and inexpensive gate circuit presently to be described.

BRIEF SUMMARY OF THE INVENTION

The invention comprises a solid state symmetrical switching device connected in series across a source of alternating voltage, and a gate circuit arrangement adapted to provide the switching device with a train of gate pulses continuously during one complete half cycle of one polarity of the alternating voltage and at the beginning and end of the other half cycle of the voltage in response to a predetermined condition such as low level of light intensity. The train of pulses latches the switching device "on" for substantially the total time duration of each half cycle so that phase control, with its attendant noise characteristic, is substantially reduced if not eliminated altogether. When the light condition raises above a preset level, the gate circuit develops a voltage level insufficient to gate the switching device thereby removing power from the load by opening the load circuit.

The light level is preferably detected by a photosensitive resistance device which together with another resistance means forms a voltage divider circuit that provides the gate circuit with a good hysteresis characteristic, i.e., a large on-off light level ratio which prevents activation of the control circuit with minor changes in light levels.

The latching and hysteresis characteristics of the novel gate circuit are attained with a minimum of low cost components. As will be seen, no active devices such as transistors, are employed in the gate circuit.

THE DRAWINGS

Figure 2:
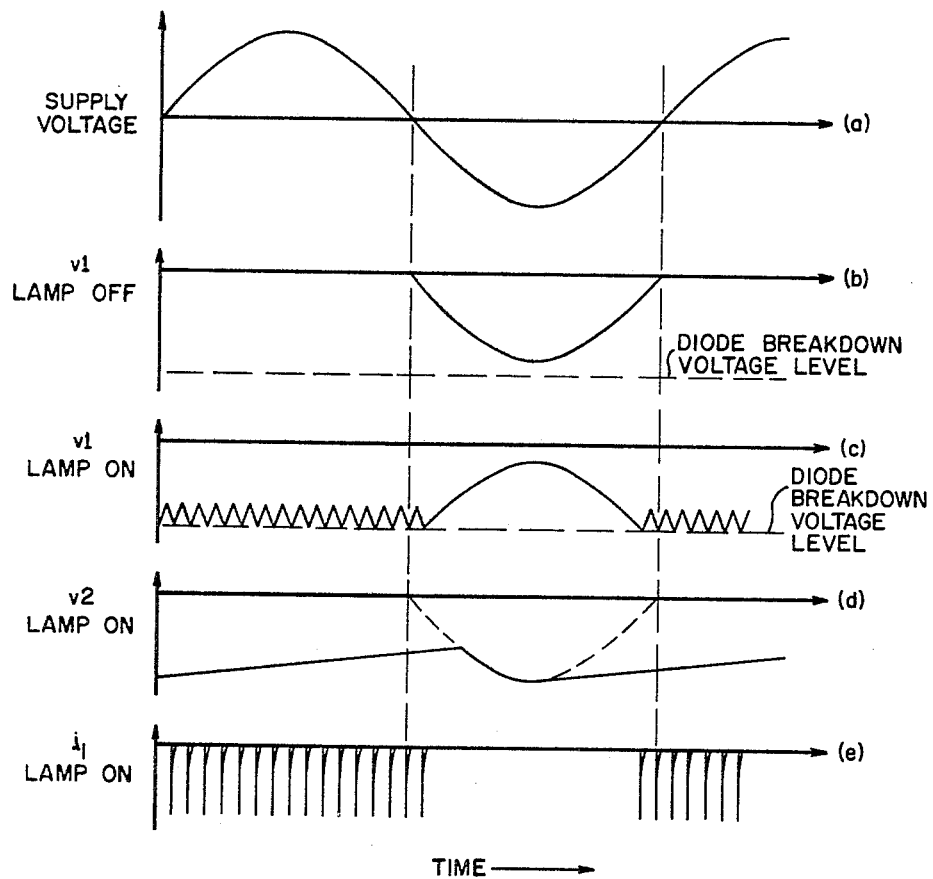

The objects and advantages of the invention will be more apparent from a review of the following detailed description taken in connection with the following drawing in which:

FIGURE 1 shows a schematic embodiment of the control circuit constructed in accordance with the principles of the present invention; and FIG. 2 shows waveforms representative of the voltages utilized and developed by the circuit of FIG. 1.

DESCRIPTION OF THE PREFERRED EMBODIMENT

Specifically, there is shown in FIG. 1, a condition sensing control circuit generally designated 10 including a load means 12 connected in series with a solid state or semiconductor symmetrical switch 14 having terminals 15 and 16 connected across a source of alternating supply voltage 17. The load may be a lamp (or lamps) as indicated, and the symmetrical switch is of the type that, when gated, conducts current in both directions as opposed to a thyristor which can conduct current in only one direction.

The novel gate circuit for the symmetrical switch 14 is generally designated 18, and includes a resistor 20 connected between gate terminal 21 of the switch and a trigger diode 22. The trigger diodes may be any suitable device capable of becoming freely conductive when a trigger voltage is developed thereacross. The trigger diode is in turn commonly connected to a capacitor 23, a light sensing photo resistance device 24 and a resistor 25. The resistor 25 is, in turn, commonly connected to a blocking diode 27 and a resistor 28, the resistor 28 connecting the gating circuit to the terminal 15 of the switch and to one side of the supply voltage 17. The light sensitive resistor 24 and the resistors 25 and 28 form a voltage divider network, the purpose of which will be explained hereinafter.

The gating circuit 18 further includes a blocking diode 30, a current limiting resistor 31 and a second capacitor 32, all serially connected across the load 12 and to the terminal 16 of the switch. The cathode of the diode 27 is commonly connected to the anode of the diode 30 and to the resistor 31.

In operation, the alternating voltage (FIG. 2a) is applied across the symmetrical switch 14 and the lamp 12 as shown in FIG. 1. If natural or other ambient light is above a predetermined level, the switch is open and the lamp is unlit. During the positive half cycle of the alternating voltage, a small current flows through the resistor 28, the diodes 27 and 30, and the lamp 12. The voltage across the resistor 25 and the photoresistor 24 is substantially zero because of the negligible forward impedance of the diodes. Thus, a voltage essentially equal to the supply voltage appears across the resistor 28.

During the negative half cycle of the supply voltage, age $v1$ proportional to the supply voltage appears across the photoresistor 24 and the capacitor 23 with the remaining and greater portion of the voltage appearing across the resistor 28. This negative voltage appearing across the light sensitive device and capacitor is shown in FIG. 2b. As long as the light on the sensing device 24 remains above a predetermined level, the resistance of the photoresistor remains low, and the peak negative voltage $v1$ thereacross remains below the triggering or breakdown voltage of the diode 22 as shown in FIG. 2b.

If during a negative voltage swing of the alternating voltage, the light intensity has decreased to a predetermined intensity level, the resistance of the photoresistor 24 will increase to a value capable of producing a voltage thereacross corresponding to the trigger voltage level of the diode 22. When this occurs, the diode conducts and applies part of the voltage across the photoresistor 24 to the gate terminal 21 of the switch 14 through the resistor 20. The resistor 20 and the capacitor 23 form a time delay circuit which functions to widen the voltage pulse applied to the gate terminal 21 for more effective use of the symmetrical switch.

With the gating of the symmetrical switch 14, the alternating voltage is applied across the lamp load 12. As explained above, the gate voltage was developed during the negative half cycle swing of the alternating supply voltage; the triggering of the diode 22 and the gating of the symmetrical switch 14 occurs at a time slightly after the negative peak of the supply voltage.

When the supply voltage passes through zero, the switch is turned off, and thus must be gated again for it to conduct in the opposite direction during the positive half cycle of the supply voltage. The switch 14 is gated during the positive half cycle in the following manner.

When the symmetrical switch 14 is turned on (gated) during the negative half cycle, the capacitor 32 charges to nearly the peak of the supply voltage with current flow through the resistor 31, the diode 30 and the symmetrical switch. The resistor 31 limits the charging current of the capacitor 32.

With the capacitor 32 charged, a discharge path exists through the lamp 12, the photoresistor 24, the resistor 25 and the diode 27. As the supply voltage, and thus the lamp voltage decreases toward zero, the voltage of the capacitor 32 appears mainly across the photoresistor and the resistor 25. The discharge circuit does not include the resistor 28 so that the voltage divider network is now limited to the photoresistor 24 and the resistor 25. Thus, a voltage nearly equal to the supply voltage value is developed across the resistors 24 and 25 so that this voltage reaches a negative voltage value much larger than that required to trigger the diode 22. This causes the diode to be repeatedly triggered by a sawtooth voltage developed across the photoresistor (FIG. 2c) as the supply voltage approaches and passes through zero potential. The repeated triggering forms a train of gate current pulses that maintain (latch) the switch 14 in its on condition through voltage zero thereby giving the control circuit 10 the good latching characteristic mentioned earlier. The train of gate pulses, which are of a negative polarity, is graphically shown in FIG. 2e.

To turn switch 14 on the voltage across the photoresistor 24 must try to exceed the trigger voltage of diode 22. Resistors 24, 25, and 28 form a resistive voltage divider network such that a portion of the supply voltage will appear across resistor 24. For fixed values of resistors 25 and 28 the resistance of 24 must increase (with a light intensity decrease) to a value such that the voltage across 24 equals the trigger voltage of the diode 22. When this occurs, diode 22 will be triggered and the switch 14 will be turned on. With switch 14 on, as was explained above, the voltage across 24 is determined by the voltage divider formed by resistors 24 and 25, the resistor 28 no longer forming part of the divider network, and the peak value of the supply voltage which appears across capacitor 32. For a given resistance 24 the gain (the ratio of output to input voltage) of the divider formed by resistors 24 and 25 is greater than that of the divider formed by resistors 24, 25, and 28. This sudden switch from a low gain divider to a high gain divider causes the control to have an excellent latch in action.

The switch 14 is turned off by a decrease in resistance of 24 or an increase in the light intensity. The output voltage of the high gain divider is decreased as the resistance of 24 is decreased. Eventually the voltage across resistance 24 is too small to trigger the diode 22 and then the switch 14 will be turned off. With the switch 14 off, the resistor 28 will once again enter the voltage divider circuit such that a sudden change will be made from the high gain divider to the low gain divider. This will further decrease the voltage across resistor 24 thus giving the control an excellent latch out characteristic.

Therefore, the turn on and turn off light levels are substantially separated so that the switching function of the control circuit 10 is not affected by slight changes in the ambient light or where the light ambient holds at a former switching point.

During the positive half cycle of the supply voltage, the lamp voltage adds to the discharge voltage on the capacitor 32 thereby producing the train of negative pulses continuously through the whole period of the positive half cycle as shown in FIG. 2e.

During the negative half cycle, the voltage across the lamp 12 is opposed to the voltage across the capacitor 32 so that the gate current pulses are cut off except at the beginning and end of the negative half cycle; as explained above, during the negative half cycle swing with the symmetrical switch on, the capacitor 32 charges; with the capacitor charging, the sawtooth voltage across the photoresistor 24 ceases (FIG. 2c) and the train of gate current pulses ceases as best seen in FIG. 2e.

The above description included a low ambient light intensity condition capable of producing a diode 22 triggering voltage across the photoresistor 24. As the light intensity begins to rise, the voltage ($v1$) across the photoresistor will decrease. When the light intensity reaches a predetermined level, the magnitude of the voltage ($v2$) across the capacitor 32 will decrease to a value such that the portion of the voltage which appears across diode 22 at the beginning of the negative half cycle, shown in FIG. 2d, is below, the value needed to trigger the diode 22. Thus the symmetrical switch 14 will not turn on, thereby turning off the lamp 12 and opening the charging circuit for the capacitor 32. The voltage $v2$ across the capacitor 32 continues to decay when switch 14 is not turned on:

thus diode 22 will not be triggered during the positive half cycle either and thus switch 14 will remain off.

From the foregoing description it should now be apparent that a new and improved condition responsive control circuit has been disclosed. Without the use of transistors, and with a minimum number of inexpensive components, the control circuit 10 functions in a reliable manner with excellent hysteresis and latching characteristics. The hysteresis characteristic is produced by a variable voltage divider network which provides a large ratio of "turn on" to "turn off" light levels. With the two switching points sufficiently separated, slight ambient light intensity changes will not cause oscillation switching of the control circuit.

The latching characteristic of the control circuit 10 (control is either full "on" or full "off") is produced by the train of gate pulses provided by the discharge circuit during the positive half cycle of the supply voltage and during the beginning and ending periods of the negative half cycle. The train of pulses maintains the symmetrical switch is an "on" condition when the supply voltage changes polarity.

Though the invention has been described with a certain degree of particularity, it should be noted that changes may be made therein without departing from the spirit and scope of the invention. For example, the positive half cycle of the supply voltage may be used to trigger the diode 22 instead of the negative half cycle voltage as described.

What is claimed is:

1. A control circuit for controlling the supply of alternating voltage to a load, the circuit comprising:
   a solid state symmetrical switch adapted to be connected in series with the load across the supply of alternating voltage,
   the switch having a gate terminal,
   a gate circuit for gating the symmetrical switch,
   said gate circuit including a trigger diode, a capacitor circuit, and a resistive voltage divider network including a condition sensing device,
   the condition sensing device connected to develop a diode trigger voltage for gating the symmetrical switch when the condition being sensed changes in a predetermined manner during half cycle swings of one polarity of the alternating voltage,
   the capacitor circuit including a capacitor and a blocking diode connected across the load to be charged during half cycles of said one polarity, said capacitor also being connected to said condition sensing device to effect gating of the symmetrical switch during the beginning and ending periods of the half cycle swings of one polarity, and during the complete half cycle periods of the other polarity of the alternating voltage.

2. The control circuit of claim 1 in which the capacitor circuit gates the symmetrical switch by being connected to provide a series of gate current pulses for the switch.

3. The control circuit of claim 1 in which the gate circuit includes an RC circuit for widening the gate pulses.

4. The control circuit of claim 1 in which the condition sensing device is a light sensing device.

5. The control circuit of claim 1 in which the condition sensing device is a photosensitive resistor.

6. The control circuit of claim 1 in which the voltage divider network and the symmetrical switch are connected in such a manner that a change in the gain of the divider network is effected by operation of the switch.

7. The control circuit of claim 1 in which the voltage divider network and the symmetrical switch are connected in such manner that the resistance of the network is changed by operation of the switch.

8. The control circuit of claim 1 in which the symmetrical switch and the load are connected in series,
   the trigger diode connecting the gate terminal of the switch to a common junction in the voltage divider network including one side of the condition sensing device,
   blocking diode means commonly connecting the capacitor circuit across the load and to the other side of the condition sensing device,
   a second blocking diode means connecting the capacitor circuit to another portion of the divider network, and
   the divider network connected across the symmetrical switch and to one side of the load.

References Cited

UNITED STATES PATENTS

| 3,328,606 | 6/1967 | Pinckaers | 307—252 |
| 3,335,291 | 8/1967 | Gutzwiller | 307—252 |

OTHER REFERENCES

Galloway: Using the Triac For Control of AC Power. G.E. Application Note 200, 35, March 1966, pp. 1, 6, 15.

JAMES W. LAWRENCE, Primary Examiner

E. R. LA ROCHE, Assistant Examiner

U.S. Cl. X.R.

250—206; 307—311; 315—159